United States Patent
Kunow et al.

(10) Patent No.: US 7,433,214 B2
(45) Date of Patent: Oct. 7, 2008

(54) DC CONVERTER

(75) Inventors: Peter Kunow, Berlin (DE); Klaus Biester, Wienhausen (DE)

(73) Assignee: Cameron International Corporation, Houston, TX (US)

( * ) Notice: Subject to any disclaimer, the term of this patent is extended or adjusted under 35 U.S.C. 154(b) by 293 days.

(21) Appl. No.: 10/489,584

(22) PCT Filed: Sep. 18, 2002

(86) PCT No.: PCT/EP02/10469

§ 371 (c)(1),
(2), (4) Date: Aug. 5, 2004

(87) PCT Pub. No.: WO03/026115

PCT Pub. Date: Mar. 27, 2003

(65) Prior Publication Data

US 2004/0246753 A1 Dec. 9, 2004

(30) Foreign Application Priority Data

Sep. 19, 2001 (DE) .............................. 201 15 474 U

(51) Int. Cl.
*H02J 1/10* (2006.01)
*H02M 7/10* (2006.01)

(52) U.S. Cl. .......................................... 363/65; 307/61

(58) Field of Classification Search .................. 363/65, 363/68, 71; 323/272, 225, 268; 307/54, 307/58, 61, 63, 77, 82

See application file for complete search history.

(56) References Cited

U.S. PATENT DOCUMENTS

| 1,979,425 | A | 11/1934 | Van Der Woude |
| 2,387,800 | A | 10/1945 | Leland et al. |
| 3,275,737 | A | 9/1966 | Calter |
| 3,324,741 | A | 6/1967 | Anderson |
| 3,353,594 | A | 11/1967 | Lewis |

(Continued)

FOREIGN PATENT DOCUMENTS

DE 145982 1/1981

(Continued)

OTHER PUBLICATIONS

J. R. Pinheiro et al.; *Isolated Interleaved-Phase-Shift-PWM dc-dc ZVS Converters:* IEEE 2000; (pp. 2383-2388).

(Continued)

*Primary Examiner*—Gary L Laxton
(74) *Attorney, Agent, or Firm*—Conley Rose, P.C.

(57) ABSTRACT

A DC converter is connected to a DC source on its input side. On the output side, the DC delivers a converted DC voltage to at least one electric consumer via a cable connection. To improve such a DC converter in that it has a comparatively simple structural design and is able to reliably convert high DC voltages even in the case of high power, and in such a way that the reliability of the converter is increased and cooling systems entailing high costs can be dispensed with, the DC converter comprises a plurality of DC converter components, each of said DC components being, on the input side, serially connected to the DC source and, on the output side connected in parallel to the cable connection so as to provide the converted DC voltage for the electric consumer.

23 Claims, 2 Drawing Sheets

U.S. PATENT DOCUMENTS

| | | | |
|---|---|---|---|
| 3,887,898 A | 6/1975 | Jones | |
| 3,980,808 A | 9/1976 | Kikuchi et al. | |
| 4,062,057 A | 12/1977 | Perkins et al. | |
| 4,124,884 A | 11/1978 | Episcopo | |
| 4,290,101 A * | 9/1981 | Hergenhan | 363/65 |
| 4,363,975 A | 12/1982 | Beattie | |
| 4,423,747 A | 1/1984 | Heiser et al. | |
| 4,500,832 A | 2/1985 | Mickiewicz | |
| 4,521,642 A | 6/1985 | Vives | |
| 4,533,987 A | 8/1985 | Tomofuji et al. | |
| 4,548,383 A | 10/1985 | Wölfges | |
| 4,617,501 A | 10/1986 | Smith | |
| 4,639,714 A | 1/1987 | Crowe | |
| 4,745,815 A | 5/1988 | Klopfenstein | |
| 4,788,448 A * | 11/1988 | Crowe | 307/31 |
| 4,814,963 A | 3/1989 | Petersen | |
| 4,920,811 A | 5/1990 | Hopper | |
| 5,031,088 A | 7/1991 | Tanaka | |
| 5,055,991 A | 10/1991 | Carroll et al. | |
| 5,105,351 A | 4/1992 | Harada et al. | |
| 5,138,249 A | 8/1992 | Capel | |
| 5,168,422 A | 12/1992 | Duncan | |
| 5,195,721 A | 3/1993 | Akkerman | |
| 5,230,033 A | 7/1993 | Soodak | |
| 5,285,563 A | 2/1994 | Nove et al. | |
| 5,297,015 A | 3/1994 | Miyazaki et al. | |
| 5,301,096 A * | 4/1994 | Klontz et al. | 363/37 |
| 5,311,419 A | 5/1994 | Shires | |
| 5,418,707 A | 5/1995 | Shimer et al. | |
| 5,489,897 A | 2/1996 | Inoue | |
| 5,508,903 A | 4/1996 | Alexandrov | |
| 5,563,780 A | 10/1996 | Goad | |
| 5,572,182 A | 11/1996 | De Pinho Filho et al. | |
| 5,573,032 A | 11/1996 | Lenz et al. | |
| 5,610,452 A | 3/1997 | Shimer et al. | |
| 5,629,844 A | 5/1997 | Krichtafovitch et al. | |
| 5,731,969 A | 3/1998 | Small | |
| 5,754,028 A | 5/1998 | Vezzini | |
| 5,825,638 A * | 10/1998 | Shutts | 363/21.11 |
| 5,832,996 A | 11/1998 | Carmody et al. | |
| 5,923,550 A | 7/1999 | Kumar | |
| 5,982,645 A | 11/1999 | Levran et al. | |
| 5,983,743 A | 11/1999 | McGregor et al. | |
| 5,984,260 A | 11/1999 | Rawson et al. | |
| 6,032,924 A | 3/2000 | Castle | |
| 6,041,667 A | 3/2000 | Pischinger et al. | |
| 6,073,907 A | 6/2000 | Schreiner, Jr. et al. | |
| 6,094,366 A | 7/2000 | Kalfhaus | |
| 6,095,487 A | 8/2000 | Waber | |
| 6,152,167 A | 11/2000 | Baker | |
| 6,154,381 A | 11/2000 | Kajouke et al. | |
| 6,158,295 A | 12/2000 | Nielsen | |
| 6,181,576 B1 | 1/2001 | Ikeda et al. | |
| 6,269,015 B1 | 7/2001 | Ikeda et al. | |
| 6,356,384 B1 | 3/2002 | Islam | |
| 6,385,057 B1 * | 5/2002 | Barron | 363/17 |
| 6,388,904 B2 * | 5/2002 | Nomura | 363/71 |
| 6,411,527 B1 | 6/2002 | Reinold | |
| 6,446,519 B1 | 9/2002 | Biester | |
| 6,494,257 B2 | 12/2002 | Bartlett et al. | |
| 6,559,385 B1 | 5/2003 | Johnson et al. | |
| 6,615,916 B1 | 9/2003 | Vachon | |
| 6,668,639 B2 | 12/2003 | Fong et al. | |
| 7,075,414 B2 | 7/2006 | Giannini et al. | |
| 7,264,057 B2 | 9/2007 | Rytlewski et al. | |
| 2001/0012207 A1 | 8/2001 | Nomura | |
| 2005/0013148 A1 | 1/2005 | Kunow et al. | |
| 2005/0029476 A1 | 2/2005 | Biester et al. | |

FOREIGN PATENT DOCUMENTS

| | | |
|---|---|---|
| DE | 33 03 248 | 8/1984 |
| DE | 33 16 258 | 11/1984 |
| DE | 34 17 455 | 11/1985 |
| DE | 34 24 041 | 1/1986 |
| DE | 38 32 304 | 3/1990 |
| DE | 43 44 709 | 6/1995 |
| DE | 1 199 088 | 8/1995 |
| DE | 44 14 677 | 11/1995 |
| DE | 196 14 627 | 10/1997 |
| DE | 197 14 552 | 10/1998 |
| DE | 197 50 041 | 1/1999 |
| DE | 199 09 712 | 7/2000 |
| DE | 199 63 105 | 6/2001 |
| EP | 0 028 296 | 5/1981 |
| EP | 0 303 801 | 6/1986 |
| EP | 0 626 670 | 11/1994 |
| EP | 0 384 607 | 6/1995 |
| EP | 1 024 422 | 8/2000 |
| EP | 1 107 437 | 2/2001 |
| EP | 1 244 203 | 9/2002 |
| FR | 1 390 757 | 1/1965 |
| FR | 74 28273 | 11/1976 |
| FR | 2 353 992 | 12/1977 |
| GB | 1001629 | 8/1965 |
| GB | 2 141 882 | 1/1985 |
| GB | 2 266 942 | 11/1993 |
| JP | 59 103570 | 6/1984 |
| JP | 61 076071 | 4/1986 |
| JP | 61 240858 | 3/1987 |
| JP | 62 217857 | 9/1987 |
| JP | 63 308420 | 12/1988 |
| JP | 01 114368 | 5/1989 |
| JP | 02 206362 | 8/1990 |
| JP | 03 065054 | 3/1991 |
| JP | 03 150068 | 10/1991 |
| JP | 04 200270 | 7/1992 |
| JP | 05 327381 | 12/1993 |
| JP | 07 154967 | 6/1995 |
| JP | 08 338 391 | 12/1996 |
| SU | 1270293 | 11/1986 |
| SU | 1 709 511 | 1/1992 |
| WO | WO 95/20836 | 8/1995 |
| WO | WO 96/28878 | 9/1996 |
| WO | WO 97/38479 | 10/1997 |
| WO | WO 98/30816 | 7/1998 |
| WO | WO 99/37009 | 7/1999 |
| WO | WO 01/37411 | 5/2001 |
| WO | WO 01/52397 | 7/2001 |
| WO | WO 01/84689 | 8/2001 |

OTHER PUBLICATIONS

Rene Torrico-Bascope et al; *Dual-Bridge DC-DC Converter with Soft Switching Features:* IEEE 2001; (pp. 722-727).

Demercil S. Oliveira et al; *A Lossless Communication PWM Two Level Forward Converter Operating Like a Full-Bridge:* IEEE 2000 (pp. 334-339).

J. E. Baggio et al.; *An Improved Full-Load-Range Isolated ZVS-PWM DC-DC Converter:* IEEE 2001 (pp. 708-714).

Demercil S. Oliveira et al; *A Lossless Commutation PWM Two Level Forward Converter*; IEEE 2000 (pp. 582-588).

International Search Report for Appln. No. PCT/EP02/10469 dated Oct. 23, 2003 (pp. 14).

International Search Report for Appln. No. PCT/EP02/10467 dated Sep. 29, 2003 (pp. 10).

International Search Report for Appln. No. PCT/EP02/10471 dated Jul. 14, 2003 (pp. 12).

Partial International Search Report for Appln. No. PCT/EP02/10468 dated Jan. 16, 2003 (pp. 8).

German Search Report for Appln. No. 200 18 562.4; Dated Jul. 11, 2001 (pp. 4).
German Search Report for Appln. No. 200 18 560.8; Dated Oct. 23, 2001 (pp. 4).
International Search Report for Appln. No. PCT/EP/12548 dated May 17, 2002 (pp. 2).
International Search Report for Appln. No. PCT/EP01/12550 dated Feb. 26, 2002 (pp. 6).
International Search Report for Appln. No. PCT/EP01/09513 dated Mar. 6, 2002 (pp. 7).
Chr. Rohrbach: *Handbuch für elektrisches Messen mechanischer Grössen;* 1967, Vdl—Verlag, Dusseldorf (DE) XP002156890 (pp. 448-449).
Engels, Ludwig, u.a.: *Informationsübertragung. Prozeβankopplung und und Komponenien eines Doppelrechnersystems.* In: etz-a, Bd. 98, 1977; (pp. 602-606).
Brusewitz, M.: *Elektrochemische Aktoren;* F&M Feinwerktechnik Mikrotechnik Mikroelektronik; vol. 106, No. 7/8; Jul. 1998 (pp. 527-530).
British Combined Search and Examination Report for Appln. No. GB0603306.2 dated Mar. 14, 2006 (pp. 5).
British Combined Search and Examination Report for Appln. No. GB0603307.0 dated Mar. 14, 2006 (pp. 6).
British Combined Search and Examination Report for Appln. No. GB0603309.6 dated Mar. 14, 2006 (pp. 6).
Office Action dated Dec. 15, 2006 for U.S. Appl. No. 10/489,583 (21 p.).
Office Action dated Feb. 23, 2007 for U.S. Appl. No. 10/836,559 (20 p.).
Office Action dated Dec. 19, 2006 for U.S. Appl. No. 10/489,533 (16 p.).
Office Action Dated Oct. 9, 2007 for U.S. Appl. No. 10/415,510; (24 p.).
Office Action Dated Nov. 13, 2007 for U.S. Appl. No. 10/489,573 (26 p.).
Office Action Dated Oct. 18, 2007 for U.S. Appl. No. 10/489,533; (15 p.).
Office Action Dated Nov. 13, 2007 for U.S. Appl. No. 10/489,583 (16 p.).
Translation of Official Action dated Jan. 17, 2007 for Norwegian Appl. No. 20031892 (3 p.).
Notice of Allowance and Fee(s) Due for U.S. Appl. No. 10/489,583, dated Jul. 16, 2008 (23 p.).
Supplemental Notice of Allowability for U.S. Appl. No. 10/489,583, dated Aug. 4, 2008 (5 p.).

* cited by examiner

DC CONVERTER

CROSS-REFERENCE TO RELATED APPLICATION

The present application claims priority to PCT/EP02/10469 filed 18 Sep. 2002 and to German Application No. DE 201 15 474 filed 19 Sep. 2001, all hereby incorporated herein by reference.

BACKGROUND OF THE INVENTION

A DC converter is connected to a DC source on its input side. On the output side, the DC converter delivers a converted DC voltage to at least one electric consumer via a cable connection.

Such DC converters have a wide field of use and are especially used where a DC voltage has to be converted and where the converted DC voltage should be comparatively stable. Such fields of use are e.g. photovoltaic systems, the field of automotive vehicles, DC traction drives for underground railways and for streetcars, domestic drives for hairdryers, drilling machines or the like, semiconductor technology and telecommunications.

In the case of high DC voltages on the input side, suitable DC converters are not realizable, since their dielectric strength is determined by the respective dielectric strengths of their components. Components having dielectric strengths of more than 1000 V, e.g. 3000 or 6000 V, are, however, not available or they can hardly be realized technically. If such a converter is nevertheless suitable for such high DC voltages, the whole system will collapse if the converter fails to operate. In addition, even if the efficiency is comparatively high, the DC converter will have a dissipation power that produces a substantial amount of heat comparatively locally. This amount of heat may destroy certain components of the converter. In order to avoid such destruction, complicated cooling systems are required which entail high costs.

BRIEF SUMMARY OF THE PREFERRED EMBODIMENTS

It is therefore the object of the present invention to improve a DC converter of the type mentioned at the start in such a way that it has a comparatively simple structural design and is able to reliably convert high DC voltages even in the case of high power, and in such a way that the reliability of the converter is increased and cooling systems entailing high costs can be dispensed with.

In connection with the features of the generic clause of claim 1, this object is achieved in that the DC converter comprises a plurality of DC converter components, each of said DC converter components being, on the input side, serially connected to the DC source and, on the output side, connected in parallel to the cable connection so as to provide the converted DC voltage for the electric consumer.

Due to the plurality of DC converter components used, each converter component only has to deal with part of the high input voltage, said high input voltage being converted into a suitable output voltage by the respective converter component. When all the converter components have the same type of structural design, each converter component will convert the same percentage of the input voltage. If the input voltage is e.g. 6000 V and if 30 converter components are provided, each converter component only has to convert a voltage of 200 V into a suitable output voltage. This results from the serial connection on the input side of the converter components.

On the output side, each converter component delivers the same voltage and feeds this voltage into the cable connection due to the parallel connection.

It is, of course, also possible that the converter components have different structural designs or are utilized to different degrees, so that different proportional parts of the input voltage are converted by the various converter components into identical output voltages.

The fact that the voltage conversion is distributed to a plurality of converter components also guarantees that a failure of one, two or more than two converter components will not lead to a breakdown of the whole supply of the electric consumer on the output side. Instead, the converter components which are still capable of operating can, when adjusted accordingly, replace the ineffective converter components fully or at least to a very large extent (redundancy).

In view of the fact that also the dissipation power of the DC converter is distributed to said plurality of converter components, the heat development is distributed over a larger area as well, and can be eliminated by simple cooling systems. When the distance between the respective converter components is sufficiently large in this connection, so that the converter components will not mutually heat themselves, cooling by the ambient air or by another medium surrounding the converter components may be sufficient, so that separate cooling means can be dispensed with.

Such converter components for an input voltage of e.g. a few hundred volts are nowadays commercially available, whereas converter components for a few thousand or for several thousand volts on the input side are not available at all or are at least very expensive and complicated.

The parallel connection of the converter components on the output side results, depending on the power of the individual converter components, in the total power of the system. Depending on the total power desired, the number and the structural design of the converter components are selected accordingly. The overall system can easily be adapted to given requirements in this way.

In order to satisfy requirements with respect to the control of mains fluctuations and load control, the tendency towards miniaturization and the wish for reducing the dissipation power, the converter components can be implemented as clocked switched mode mains power supplies. Such clocked switched mode mains power supplies have, in comparison with conventional power supply units, an efficiency that is in some cases higher than 90%, a reduction of volume and weight of up to 60%, a voltage stabilization of less than 1-2%, they require only a small amount of filtering means and their price-performance payoff is more advantageous.

There are electric consumers which require both a high voltage and a high power. If the power and the voltage are suddenly demanded, when the electric consumer is switched on, and are not yet available in the system, the system may collapse due to a feedback to e.g. the DC source. In order to avoid such a collapse and a negative feedback, the clocked switched mode mains power supply has on the input side thereof a load which is connected in parallel to a transformer of said switched mode mains power supply.

The DC converter according to the present invention is so conceived that, already prior to switching on or supplying the electric consumer, the voltage and the power in the system are increased to at least the values demanded by the electric consumer. Until the electric consumer actually operates, the voltage drops across the load and the power is converted into heat as dissipation power. Only when the load will then demand power, this power will be supplied via the various converter components and less voltage will drop across the load and be converted into heat.

For the DC source a stable utilization and a constant load are always discernible, i.e. the respective power distribution takes place in situ and is no longer fed back to the DC source and the units associated therewith.

The load can be implemented as a Zener diode so that, if necessary, voltage and power can be built up rapidly to desired values only a short time before they are demanded by the electric consumer. Full voltage and full power can in this way be built up within a few milliseconds and consumed by the Zener diode. The electric consumer is only connected or additionally connected when voltage and power have been built up completely. The voltage and the power are then supplied to the electric consumer, only a residual voltage dropping across the Zener diode and only a small percentage of the power (a few percent) being consumed there. If the electric consumer is then switched off, the whole voltage will again drop across the Zener diode and said Zener diode will consume the full power in the system. Subsequently, the voltage and the power can be reduced to a lower value. The reduced values are sufficient for supplying respective components of the system, such as monitoring and control means, which are also active if no electric consumer has been connected or additionally connected.

If a supply of components by the DC converter according to the present invention is not necessary, the voltage and the power can also be switched off completely or reduced to zero.

As soon as there is again a demand from an electric consumer, voltage and power are again built up within a few milliseconds.

During application of full voltage and of full power, especially the DC source has always applied thereto a uniform load, since a suitable distribution of voltage and power to the Zener diode and the electric consumer takes place in situ at the DC converter.

The Zener diode can be implemented in the form of field effect transistors or load resistors. This also permits a control of the voltage drop across the Zener diode so as to adapt the Zener diode to the requirements in question.

Furthermore, the Zener diode also guarantees in each converter component a good heat dissipation of dissipation power that has there been converted into heat. The heat in question is no longer generated locally within close limits, but it is generated at a large number of locations so that the heat can be given off directly into the air or into water or the like. Separate cooling systems are not necessary.

Furthermore, the Zener diode may have a very steep limiting characteristic so as to stabilize the output voltage still further, if necessary.

If the Zener diodes and the respective converter components have the same type of structural design, it is also guaranteed that identical current intensities are distributed to each component. The voltage is stabilized up to a range of 2, 3 or 5% at the most.

It can also be considered to be advantageous when the switched mode mains power supply is clocked on the primary side so as to galvanically separate the output side and the input side.

The switched mode mains power supply can be implemented as a push-pull converter so as to use a switched mode mains power supply which is also well adapted to high power values. The push-pull converter can be implemented as a half-bridge or as a full-bridge push-pull converter.

The switched mode mains power supply can include a switching transistor, especially a power MOSFET or a power BIMOSFET, so that a transformer of the switched mode mains power supply, which is clocked on the primary side, can be switched electronically in a simple way. In this connection, attention should be paid to the fact that, e.g. for a full-bridge push-pull converter, four such switching transistors are respectively connected in pairs.

The switching transistors can be clocked in a push-pull mode with a clock cycle ratio of 1:1 so as to obtain a low current consumption of the transformer in the push-pull converter.

In order to obtain the least possible amount of harmonic waves on the output side, the switched mode mains power supplies of the DC converter can be clocked synchronously.

The switched mode mains power supplies of the DC converter can be clocked in a phase-shifted mode so as to shift, especially in the case of the communication connection in the direction of the DC source, the cutoff frequency of the system upwards as far as possible so that the signals transmitted for said communication connection will be interfered with as little as possible.

A simple phase shift generating only a minor amount of harmonic waves will occur when the respective phase shift of neighbouring switched mode mains power supplies amounts to 1/n, when n is the number of switched mode mains power supplies of the DC converter. In this way, the $n+1^{st}$ switched mode mains power supply would again be in phase with the first switched mode mains power supply (cyclic phase shift). In addition, the magnitude of the total interfering voltage produced will in this case only be 1/n of the interfering voltage of an individual component.

In order to realize in this respect a simple cable connection to the DC source, which requires only a small cross-section for transmitting the DC voltage and which also permits a reliable and faster transmission through the communication connection, the DC converter can be connected to the DC source via a coaxial cable connection.

In order to remove interfering frequencies especially from the frequency range required for the communication connection, the DC converter can be provided with a filter means preceding said DC converter on the input side thereof. This filter means filters especially a frequency range of up to approx. 50 kHz.

In order to realize suitable communication connection in a simple way and only after the filtering, a means for coupling data signals in/out can be connected upstream of said filter means in the direction of the DC source.

A controller can be associated with at least the DC converter and the components thereof so as to design the DC converter in such a way that said DC converter and, if necessary, also the electric consumer connected thereto can be can be controlled and monitored autarkically. This controller can e.g. detect failure of a converter component and, if desired, also the position of said converter component. This information can be transmitted via the communication connection and the means for coupling data signals in/out to the DC source and the units associated therewith. There, the information can be displayed in a suitable manner on a reproduction device, such as a screen or the like. If a relevant number of converter components failed, a repair demand can additionally be supplied by the controller. Until then, it is possible to readjust the still operational converter components in an appropriate manner so as to compensate for the failure of the damaged converter components.

The compensation can be effected e.g. in that, especially in the case of failure of another switched mode mains power supply of the DC converter, each Zener diode is adapted to be readjusted so as to increase the input voltage of the respective switched mode mains power supply and, consequently, also the output voltage thereof to such an extent that the failure of the damaged switched mode mains power supply or supplies is compensated for by the still operational switched mode mains power supplies.

It is also possible that a suitable readjustment of the output voltage of one switched mode mains power supply is effected directly via a variation of the clock cycle ratio of the switching transistors, if other switched mode mains power supplies fail to operate.

In order to activate the switching means of the various switched mode mains power supplies while controlling or regulating especially the controller, the switched mode mains power supply can be provided with a pulse modulation means which outputs a series of pulses having variable widths and/or heights and/or frequencies so as to clock the switching means in question or rather the switching transistors defining the same.

It should additionally be pointed out that the filter means between the DC converter and the DC voltage source can be realized e.g. by comparatively small capacitors, since, due to the fact that the individual converter components are clocked in a phase-shifted mode, the cut-off frequency of the system is very high.

The use of a load on the input side of each converter component is particularly advantageous according to the present invention. The load is important especially when the system is powered up to high voltages, e.g. from 3000 V to 6000 V, and when the power level made available to the electric consumers is increased accordingly, since said load permits powering up of the overall system before the electric consumer is actually connected or additionally connected. As long as power is not yet demanded by one of the electric consumers, the respective power will be consumed at one of the various loads of the converter components. Hence, a stable utilization of the cable connection or coaxial cable connection to the DC source already exists. A supply of power to the electric consumer will be effected only afterwards, e.g. by connecting or additionally connecting said electric consumer. Even then, a certain part of the power (a few percent) will still be consumed by the load and by the Zener diode defining said load, whereas most of the power will be supplied to the electric consumer or consumers, i.e. power distribution is effected in situ in the area of the DC converter and a feedback, e.g. to the DC source, does not take place.

The special mode of switching of the DC converter components also guarantees that power, voltage and current can easily be adapted to respective requirements. Depending on the voltage and power required, a smaller or large number of suitably designed converter components can be used.

BRIEF DESCRIPTION OF THE DRAWINGS

In the following, advantageous embodiments of the present invention will be explained in detail making reference to the figures added as drawings.

DETAILED DESCRIPTION OF THE PREFERRED EMBODIMENTS

Figure 1:
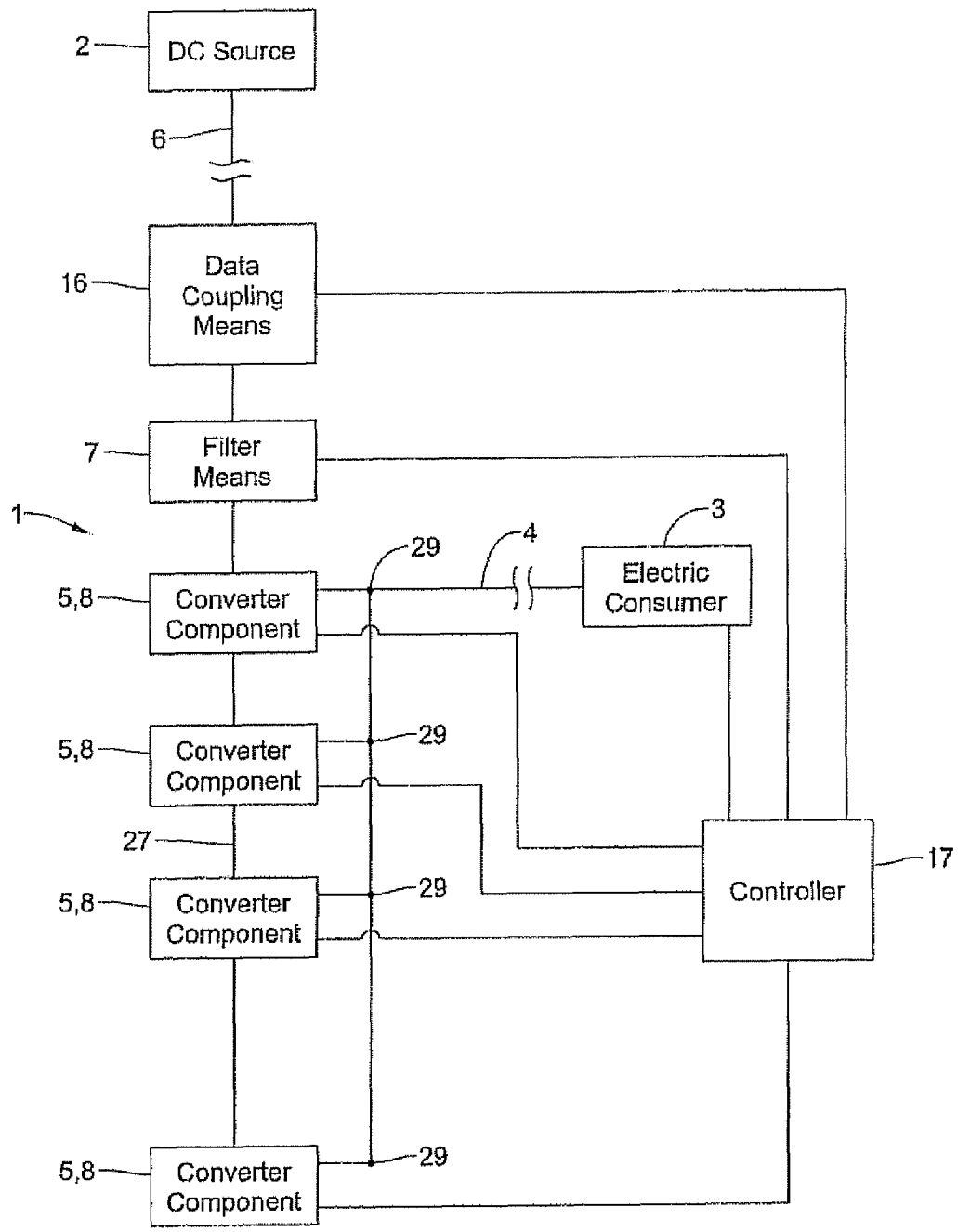
FIG. 1 shows a schematic representation of an embodiment of DC converter according to the present invention.

FIG. 1 shows a schematic circuit diagram of an embodiment of a DC converter 1 according to the present invention. This DC converter comprises a number of DC converter components 5 realized by switched mode mains power supplies 8. The switched mode mains power supplies 8 are preceded by a filter means 7 in the direction of a DC source 2. The DC source 2 is normally arranged far away from the DC converter 1. The respective coaxial cable connection 6 between the DC source 2 and the DC converter 1 serves to transmit the DC voltage and may have a length of e.g. several kilometers; it may also have a length of 50, 60 or more kilometers. Due to the transmission of a high DC voltage, only low line losses occur along the coaxial cable connection 6 and, simultaneously, also a communication connection can be realized over this cable connection. Additional attenuation losses, as in the case of an AC voltage, do not occur.

For feeding respective data signals for the communication connection in and out of the coaxial cable connection 6, a means for coupling data signals in/out 16, which is located between the filter means 7 and the DC source 2, is arranged upstream of the filter means 7.

Figure 2:
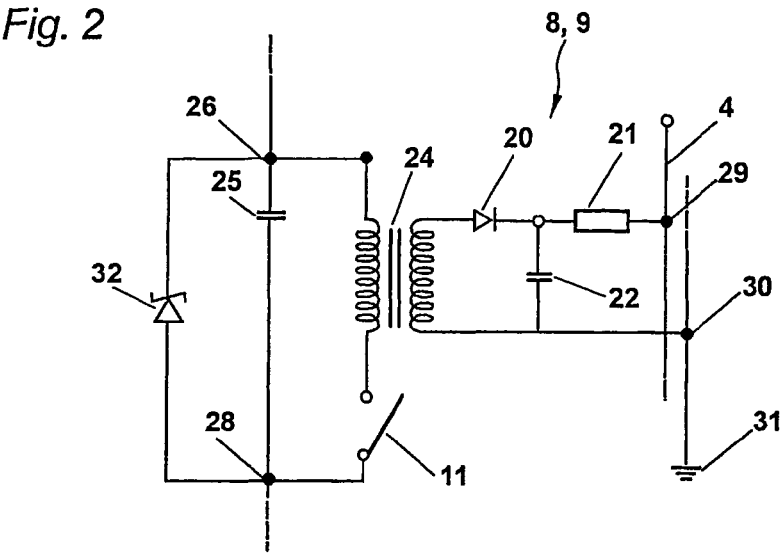
FIG. 2 shows a schematic circuit diagram of a push-pull converter for use as a switched mode mains power supplying FIG. 1.
Figure 3:
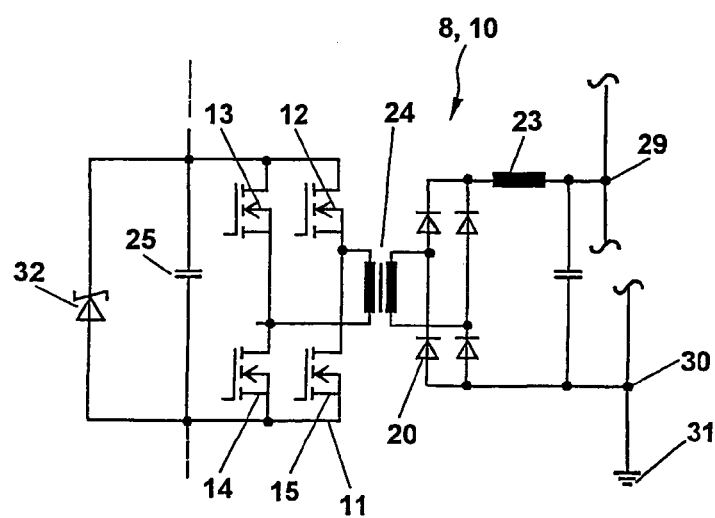
FIG. 3 shows a circuit for a full-bridge push-pull converter.
Figure 4:
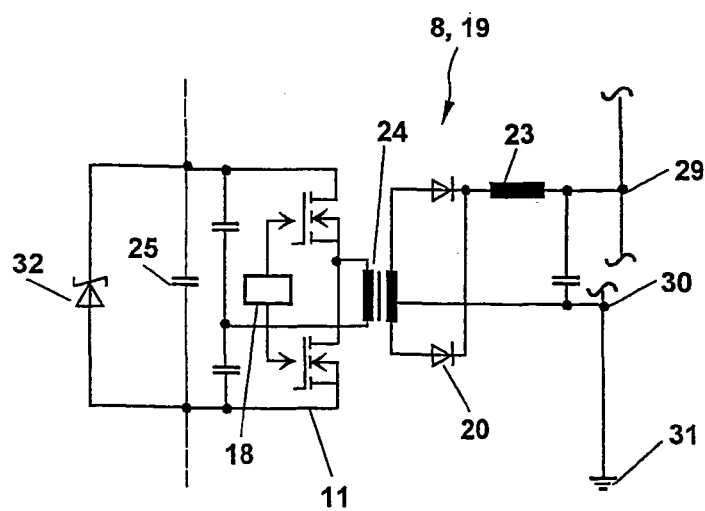
FIG. 4 shows a circuit for a half-bridge push-pull converter.

The various switched mode mains power supplies 8 are each implemented as push-pull converters, cf. FIGS. 2-4. These push-pull converters are serially interconnected on the input side via a respective line 27 and they are also connected to the coaxial cable connection 6. On the output side, the respective switched mode mains power supplies are connected parallel to one another and they are connected to a cable connection 4. The cable connection 4 serves to supply at least one electric consumer 3 with DC voltage converted by the converter components 5. Only by way of example, a few values are here indicated for the DC voltage supplied by the DC source 2, the power transmitted via the cable connection and the voltage provided on the output side of the DC converter 1. The DC source can, for example, transmit 6000 V via the coaxial cable connection 6 to the DC converter 1. When the DC converter components have the same type of structural design, a voltage of 6000 V/n will drop across each of these components due to the serial connection of the DC converter components 5, n being the number of converter components 5. If n is e.g. 30, a voltage of 200 V will drop across each converter component. This voltage is converted into an output voltage of e.g. 300 V by each of the respective converter components 5 and fed parallel into the cable connection 4 for supplying the electric consumer or consumers 3.

Such electric consumers are e.g. actuators, such as a positioning device, a motor or the like, which serve to operate certain means, such as valves, restrictors, pumps, shut-off devices and the like. These means are used e.g. for controlling the flow of a fluid into a line and within the line. If there is e.g. a leak in the line and if a possibly aggressive fluid escapes into the surroundings, an associated fluid source can be shut off against the line by means of a suitable shut-off device, whereby further discharge of the fluid into the surroundings can be prevented. Accordingly, the valves and restrictors can control the flow of the fluid as additional units. The respective actuators may also be arranged comparatively far from the DC converter 1, and they are supplied with suitable power and suitable voltage via the cable connection 4 according to requirements.

The coaxial cable connection 6 may also be very long so that the DC source and other units associated therewith are arranged at a remote site. The coaxial cable connection may e.g. have a length of several kilometers, and it may also have a length of 50 or 60 kilometers or more. The DC source and the additional units associated therewith, which are not shown in detail in FIG. 1, may e.g. be occupied by operators and arranged at an easily accessible point of the earth's surface or of the surface of the sea. The DC converter 1 and the electric consumers supplied thereby are, however, arranged at a point which is not easily accessible, such as below ground or below the surface of the sea.

For controlling the DC converter 1 and for transmitting respective data to the DC source 2 as well as for receiving respective data from said DC source, a controller 17 is provided. This controller is used for controlling, monitoring and, if necessary, regulating the various components of the DC converter 1. The controller 17 supervises also respective parameters of the electric consumer or consumers 3 and switches this/these electric consumers 3 on or off, if necessary.

In FIG. 1 the respective connections of the controller 17 to the units shown in said figure are indicated by broken lines.

Reference should be made to the fact that the controller 17 also monitors the means for coupling data signals in/out 16 and thus the communication connection with the DC source 2.

FIG. 2 shows a simplified embodiment for a push-pull converter 9 used as a switched mode mains power supply 8. This push-pull converter has its input terminals 26 and 28 connected in series with the other push-pull converters 9 or switched mode mains power supplies 8 according to FIG. 1. On the input side, the push-pull converter 9 comprises a Zener diode 32 and an input capacitor 25. These two components are connected parallel to each other and to a primary winding of a transformer 24.

The Zener diode 32 can be composed, in a manner known per se, of a number of transistors and load resistors.

The primary winding of the transformer 24 has associated therewith a switching means 11. This switching means is shown as a simple switch in FIG. 2. In actual fact, said switching means 11 is, however, realized by one or more switching transistors, cf. e.g. FIGS. 3 and 4; such switching transistors may be power MOSFETs, BIMOSFETs or thyristors.

The primary winding is magnetically coupled to a secondary winding of the transformer 24. The secondary winding is connected to output terminals 29 and 30 of the push-pull converter 9. A diode 20 and a load 21 are serially connected between the primary winding and the output terminal 29. The load 21 may e.g. be an inductor 23 according to FIGS. 3 and 4. The output terminals 29 of all push-pull converters 9 or switched mode mains power supplies 8 according to FIG. 1 are connected parallel to one another and to the cable connection 4. The other output terminals 30 are also connected parallel to one another and to ground 31.

On the output side of the push-pull converter 9, a smoothing capacitor 22 is connected parallel to the secondary winding of the transformer 24.

In FIGS. 3 and 4 a respective push-pull converter 9 according to FIG. 2 is shown in detail, in one case as a full-bridge push-pull converter 10 and in another case as a half-bridge push-pull converter 19, both push-pull converters 10 and 19 being shown with the respective circuit. Such circuits for full-bridge and half-bridge push-pull converters 10, 19 are known per se. The circuits shown differ from known circuits with regard to the respective connection modes of the push-pull converters on the input side and on the output side, i.e. with regard to the fact that respective terminals are serially connected on the input side and connected in parallel on the output side.

Furthermore, the Zener diode 32 on the input side of each push-pull converter 9 or 10, 19 is connected parallel to the primary winding of the transformer 24.

This Zener diode 32 serves as an input-side load of the various push-pull converters for powering up the system with regard to voltage and energy already prior to connecting or additionally connecting a respective electric consumer 3. As long as the electric consumer has not yet been connected or additionally connected, the respective energy in the system is consumed and converted into heat by the Zener diode 32. When the electric consumer is then additionally connected, energy distribution takes place in each of the push-pull converters, and it is only a small percentage of the energy that is still converted into heat by the Zener diode 32.

Due to the large number of Zener diodes and the fact that they are arranged in spaced relationship with one another, the electric energy converted into heat in said Zener diodes will not result in overheating of the DC converter 1, but, depending on the location where the converter is arranged, it can be discharged directly into air or water as waste heat. Complicated and expensive cooling systems can be dispensed with.

When the electric consumer no longer needs electric energy, it will be switched off, i.e. disconnected from the system. Subsequently, the whole energy is, in situ, again converted into heat by the Zener diode. If the electric consumer in question or another electric consumer is then not connected or additionally connected once more, the system as a whole can be run down to a lower voltage, such as 3000 V or even less than that. The reduced voltage is then still required for the function of the controller and of other units of the DC converter 1 which are always in operation.

In the full-bridge push-pull converter 10 according to FIG. 3, a total of four switching transistors 12, 13, 14, 15 are integrated in the switching means 11. The switching transistors 12, 13, 14, 15 co-operate in pairs for effecting a push-pull activation of the transformer 24, the push-pull clock cycle ratio being 1:1.

On the output side, respective diodes 20 are provided, and on the input side a plurality of input capacitors 25 is provided.

For activating the various switching transistors 12, 13, 14, 15, a pulse modulation means 18 is shown in FIG. 4. This pulse modulation means outputs a series of pulses whose widths and/or heights and/or frequencies are variable so as to clock the switching transistors 12, 13, 14 and 15 and the switching means 11, respectively.

For the sake of clarity, said pulse modulation means 18 is not shown in FIGS. 2 and 3.

The invention claimed is:

1. A DC converter for a remotely located DC powered electric consumer, comprising:
    a plurality of DC converter components in situ with the DC powered electric consumer and remote from a DC source, each of said DC converter components having an input side serially connected to the DC source and an output side connected in parallel to a cable connection so as to provide a converted DC voltage for the DC powered electric consumer,
    each DC converter component having on the input side thereof a switch-based power conversion path, an input capacitor, and a separate power dissipation path,
    wherein the power dissipation paths enable a full power for the DC powered electric consumer to be built up in situ with the DC powered electric consumer before the switched-based power conversion paths operate.

2. A DC converter according to claim 1 wherein the cable connection comprises a coaxial cable connection.

3. A DC converter according to one claim 1 wherein the DC converter is provided with a filter preceding said DC converter on the input side thereof.

4. A DC converter according to claim 3 further comprising a data couple/decoupler connected upstream of said filter in the direction of the DC source.

5. A DC converter according to claim 4 further comprising a controller that is associated with at least one of the components selected from the group consisting of the DC converter, the DC converting components, the filter, and the data coupler/decoupler.

6. A DC converter according to claim 1 wherein each DC converter component is implemented as a clocked switched mode power supply.

7. A DC converter according to claim 6 wherein each clocked switched mode power supply is clocked on the primary side.

8. A DC converter according to claim 6 wherein the clocked switched mode power supplies of the DC converter are clocked synchronously.

9. A DC converter according to claim 6 wherein the clocked switched mode power supplies of the DC converter are clocked in a phase-shifted mode.

10. A DC converter according to claim 9 wherein a respective clock phase shift of neighboring clocked switched mode power supplies amounts to 1/n, where n is the number of clocked switched mode power supplies of the DC converter.

11. A DC converter according to claim 6 wherein the power dissipation paths enable distribution of power from the DC source to an input side of each DC converter before the converted DC voltage is provided to the electric consumer.

12. A DC converter according to claim 11 wherein each power dissipation path comprises a Zener diode.

13. A DC converter according to claim 12 wherein, upon the failure of a clocked switched mode power supply, a voltage across each Zener diode is adapted to be varied so as to readjust an output voltage of each non-failed clocked switched mode power supply.

14. A DC converter according to claim 11 wherein each power dissipation path comprises at least one field effect transistor.

15. A DC converter according to claim 6 wherein each clocked switched mode power supply is implemented as a push-pull converter.

16. A DC converter according to claim 15 wherein each clocked switched mode power supply comprises at least one switching transistor.

17. A DC converter according to claim 16 wherein the at least one switching transistor of each push-pull converter is clocked in a push-pull mode with a clock cycle ratio of 1:1.

18. A DC converter according to claim 16 wherein a clock cycle ratio of the at least one switching transistor can be varied to readjust an output voltage of a given clocked switched mode power supply.

19. A DC converter according to claim 16 wherein each clocked switched mode power supply comprises a pulse modulator which is operable to output a series of variable pulses to clock the at least one switching transistor.

20. A system for supplying power to a remote electrical device, the system comprising:

a DC source separated from the remote electrical device, the DC source selectively outputs a low voltage supply and a high voltage supply;
a plurality of DC voltage converters in situ with the remote electrical device, each having an input serially connected to the DC source via a conductor and each having an output connected to the remote electrical device, wherein an input side of each DC converter includes a switch-based conversion path, an input capacitor, and a resistive load in parallel,
wherein the switched-based conversion paths operate together to convert the high voltage supply for use by the remote electrical device once the high voltage supply has been distributed across all of the resistive loads.

21. The system of claim 20 wherein the length of the conductor is at least one kilometer.

22. A DC converter connected to a remote DC source, the DC converter delivering a converted voltage to at least one electric consumer via a cable connection, wherein the DC converter comprises:

a plurality of DC converter components in situ with the electric consumer, each of said DC converter components being, on an input side, serially connected to the remote DC source and, on an output side, connected in parallel to the cable connection so as to provide the converted DC voltage for the electric consumer,
each DC converter component having on the input side thereof a power dissipation path parallel to an input capacitor and a power conversion path,
the power dissipation paths being configured to distribute power from the remote DC source before the power conversion paths operate to provide the converted DC voltage to the electric consumer.

23. A system for supplying power to a remove electrical device, the system comprising:

a DC source separated from the remote electrical device, the DC source selectively supplying at least a low voltage and a high voltage; a plurality of DC voltage converters in situ with the remote electrical device, each having an input serially connected to the DC source by a conductor and each having an output connected to the remote electrical device;
a controller to monitor and regulate each DC voltage converter and to turn on and off the remote electrical device, the controller operating on the low voltage and being adapted to communicate with the DC source;
each DC converter having an input side with a switch-based conversion circuit, an input capacitor circuit, and a resistive load circuit, the circuits being in parallel;
when turning off the remote electrical device, the controller opens each switch-based conversion circuit and communicates with the DC source to reduce the high voltage to the low voltage for use by the controller;
when turning on the remote electrical device, the controller communicates with the DC source to increase the low voltage to the high voltage,
once the high voltage has been distributed to each resistive load circuit, the controller modulates each switch-based conversion circuit to convert the high voltage for use by the remote electrical device when turned on.

* * * * *